(12) United States Patent
Sanso et al.

(10) Patent No.: US 9,300,652 B2
(45) Date of Patent: Mar. 29, 2016

(54) SCOPED ACCESS TO USER CONTENT

(71) Applicant: Adobe Systems Incorporated, San Jose, CA (US)

(72) Inventors: Antonio Sanso, Allschwil (CH); Simone Tripodi, Genzano di Roma (IT); Paolo Mottadelli, Paradiso (CH)

(73) Assignee: Adobe Systems Incorporated, San Jose, CA (US)

( * ) Notice: Subject to any disclaimer, the term of this patent is extended or adjusted under 35 U.S.C. 154(b) by 115 days.

(21) Appl. No.: 14/252,416

(22) Filed: Apr. 14, 2014

(65) Prior Publication Data

US 2015/0295916 A1    Oct. 15, 2015

(51) Int. Cl.
*H04L 29/06* (2006.01)

(52) U.S. Cl.
CPC ................. *H04L 63/0807* (2013.01)

(58) Field of Classification Search
CPC ............ H04L 63/0823; H04L 63/0853; H04L 63/0861; H04L 63/18; G06Q 20/40; G06Q 20/425; G06Q 20/3276; G06F 21/43; G06F 21/36; H04W 12/06
USPC .......................................................... 726/5
See application file for complete search history.

(56) References Cited

U.S. PATENT DOCUMENTS

| | | | | |
|---|---|---|---|---|
| 2003/0200202 A1* | 10/2003 | Hsiao | ................... | G06F 21/6218 |
| 2005/0278390 A1* | 12/2005 | Kaler | ................... | G06F 21/6218 |
| 2008/0256610 A1* | 10/2008 | Patrick | ................ | G06F 21/6245 726/4 |
| 2013/0019295 A1* | 1/2013 | Park | ....................... | H04L 9/3213 726/7 |
| 2013/0086645 A1* | 4/2013 | Srinivasan | .............. | H04L 63/10 726/4 |

\* cited by examiner

*Primary Examiner* — Harunur Rashid
(74) *Attorney, Agent, or Firm* — Wolfe-SBMC

(57) ABSTRACT

Techniques for scoped access to user content are described. According to one or more embodiments, an access token is generated that includes an indication of a scope of permitted access to user content. The access token, for example, can specify scope by identifying a particular category and/or instance of content to which access is permitted. In at least some embodiments, a uniform resource identifier (URI) is used to specify the scope within the access token. When the access token is used to request user content, the URI can be mapped directly to a particularly category and/or instance of content. In at least some embodiments, direct mapping obviates the requirement for intermediate mapping and/or translation of the access token to identify requested user content.

20 Claims, 7 Drawing Sheets

SCOPED ACCESS TO USER CONTENT

BACKGROUND

In today's digital environment, protecting user information and user resources from unauthorized access is increasingly important. Accordingly, different ways of verifying that a user "is who they say they are" have been developed. Such processes and techniques are typically referred to as user authentication. Authentication is utilized in a myriad of different scenarios, and particularly for controlling access to network-based (e.g., web-based) resources.

In addition to authentication for access to user resources, controlling permissions for access to different types and/or instances of user resources is important. For instance, consider that a user has an account with a social media platform. The user's account may be associated with a variety of different types of content, such as user profile information (e.g., name, gender, date of birth, and so on), a list of the user's social media connections (e.g., friends), instances of content posted by the user (e.g., photos, videos, and so forth), contact information for the user, and so on. The user may wish to limit the type of content that may be accessed by various entities and/or individuals. For instance, a user may allow an application or other service to access the user's profile information, but may want to prevent the application from accessing other types of the user's content, such as photos. Current solutions for controlling permissions to user resources tend to be resource intensive and are prone to errors that may occur during a permissioning process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for scoped access to user content are described. According to one or more embodiments, an access token is generated that includes an indication of a scope of permitted access to user content. The access token, for example, can specify scope by identifying a particular category and/or instance of content to which access is permitted. In at least some embodiments, a uniform resource identifier (URI) is used to specify the scope within the access token. When the access token is used to request user content, the URI can be mapped directly to a particularly category and/or instance of content. In at least some embodiments, direct mapping obviates the requirement for intermediate mapping and/or translation of the access token to identify requested user content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
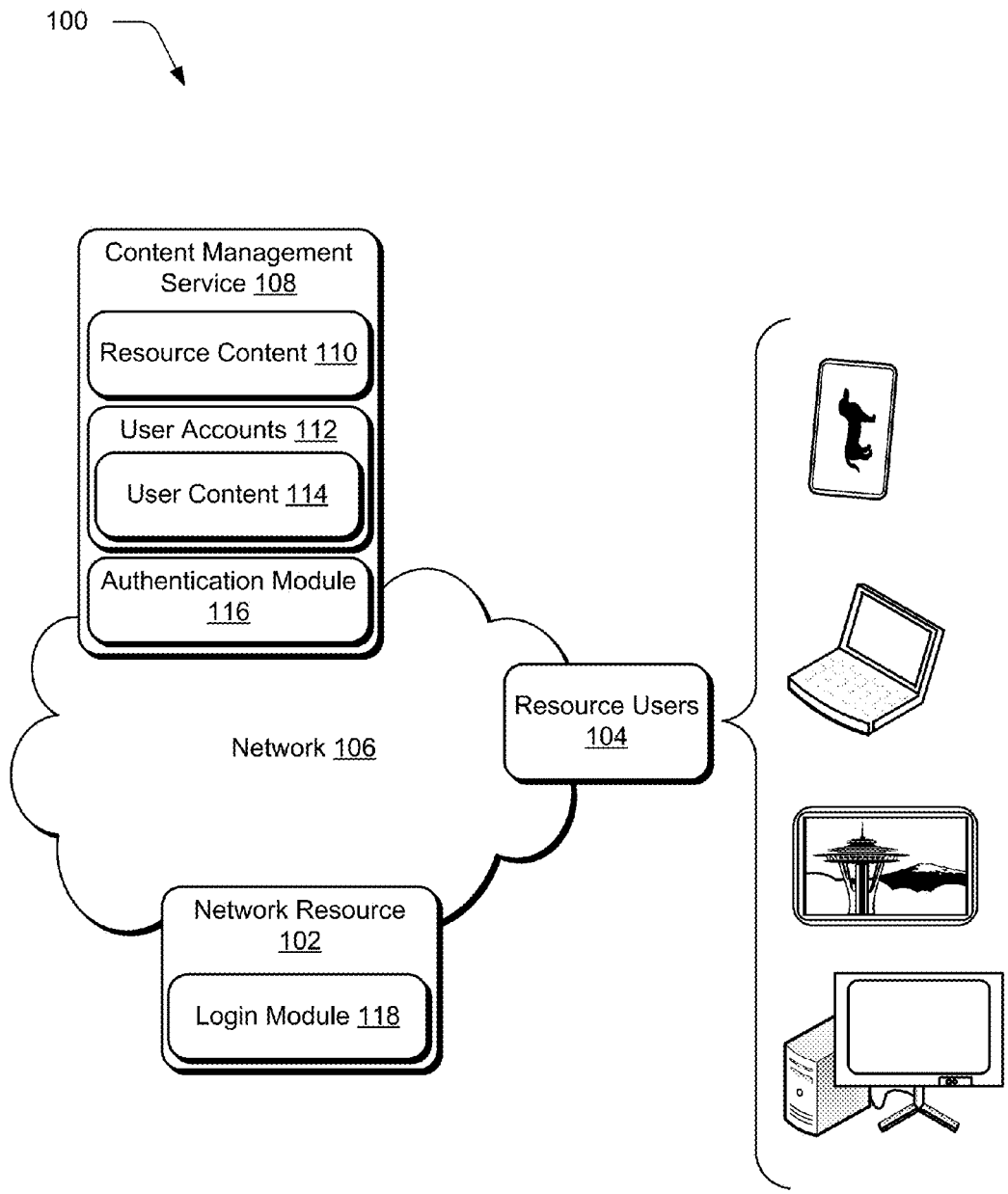
FIG. 1 is an illustration of an environment in an example implementation that is operable to employ techniques discussed herein in accordance with one or more embodiments.

Techniques for scoped access to user content are described. Generally, "scope" refers to particular portions and/or types of content. For instance, with reference to content that is arranged in a hierarchy (e.g., with parent nodes, child nodes, and so forth), "scope" may refer to a particular level and/or levels (e.g., node and/or nodes) of the hierarchy. Thus, access to user content can be scoped to enable access to certain types and/or instances of content, while preventing access to other types and/or instances of content.

According to one or more embodiments, an access token is generated that includes an indication of a scope of permitted access to user content. The access token, for example, can specify scope by identifying a particular category and/or instance of content to which access is permitted. With reference to content arranged in a hierarchy, the scope can identify a particular level and/or node in the hierarchy. In at least some embodiments, a uniform resource identifier (URI) is used to specify the scope within the access token. When the access token is used to request user content, the URI can be mapped directly to a particularly category and/or instance of content. This direct mapping obviates the requirement for intermediate mapping and/or translation of the access token to identify requested user content.

In an example implementation, consider that a travel website uses a content management service to store, manage, and serve its web content. The content management service may provide other services for the website, such as user authentication, management of user content, and so forth.

Further to the example implementation, consider that a user logs into the website and is authenticated by the content management service. The user, for instance, provides login credentials that are matched to a user account for the website. The content management service maintains various types of user content for the user, such as user profile information, lists of contacts and/or friends, user contact information, user media content (e.g., photos, video, and so forth), and so on.

The content management service then determines which of the user's content the travel website is permitted to access, e.g., the website's access scope. The travel website, for instance, may be interested in accessing the user's favorites, such as favorite places, people, food, and so forth, so that the travel website can suggest travel destinations that may be of interest to the user. Thus, the content management service may query the user as to whether the user wants to allow the travel website to access the user's list of favorites. If the user consents, the content management service generates an access token that includes an indication of the access scope, e.g., an indication that the access token permits access to the user's favorites list. In at least some embodiments, the scope may be indicated via a URI, such as "userID/favorites", which maps the access token to the user's list of favorites. Thus, the travel website may utilize the access token to request and receive data from the user's favorites, but may be prevented from accessing user content outside the scope of the user's favorites.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example methods for scoped access to user content in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for scoped access to user content discussed herein. Environment 100 includes a network resource 102, which is representative of various types of resources that can be accessed by resource users 104 via one or more networks 106. Examples of the network resource 102 includes a website, a content store, a network-hosted application (e.g., a web app), a network-hosted service, a social media platform, and so forth. Generally, the network resource 102 represents any type of resource that the resource users 104 may access to interact with, obtain, and/or access content, services, and so forth. The network resource 102 can be implemented via various types and/or combinations of computing devices, examples of which are described below in FIG. 7.

The one or more networks 106 are representative of networks via which various entities of the environment 100 may communicate. The network(s) 106 may assume a variety of different configurations, such as a local area network (LAN), a wide area network (WAN), the Internet, and so on. In at least some embodiments, functionalities discussed with reference to the environment 100 and/or other portions of the discussion herein may be implemented in a distributed environment (e.g., "over the cloud"), as further described in relation to FIG. 7.

The environment 100 further includes a content management service 108, which is representative of functionality to manage various types of content for different entities. The content management service 108, for instance, manages resource content 110 for the network resource 102. Examples of the resource content 110 include web documents (e.g., webpages), multimedia content (e.g., photos, video, audio, and so forth), user information (e.g., user profile data), and so forth.

In at least some embodiments, the content management service 108 manages content for a variety of different network resources. The content management service 108 may be implemented in different ways, such as via a distributed architecture, a cloud-based service, a data-center, and so forth.

The content management service 108 maintains user accounts 112 for the resource users 104. Generally, the user accounts 112 are associated with individual of the resource users 104, and may be leveraged to identify and track the different resource users 104. The user accounts 112 include user content 114, which is representative of collections of information and/or content for the individual resource users 104. In at least some embodiments, each of the resources users 104 is associated with a separate, distinct collection of user content 114. Examples of the user content 114 include user profile information, such as name, date of birth, gender, user preferences, and so forth. User content 114 may also include user contact information, such as email address, telephone number, address of user residence, and so forth. Other examples of the user content 114 include photographs, video, audio, electronic documents, and so forth, that are associated with a particular resource user 104. The user content 114 may include other types and/or instances of content not expressly discussed herein.

In at least some embodiments, the user content 114 tracks credentials for the resource users 104, such as user identifiers (IDs) which are used by the network resource 102 and/or the content management service 108 to differentiate users from one another. The user content 114 further includes authentication factors (e.g., passwords, tokens, biometric data, and so forth) for the resource users 104 which are used during authentication processes. Thus, the user content 114 is generally representative of diverse collections of user data that can be leveraged for various purposes.

As further detailed herein, the user content 114 can be arranged hierarchically, and access to different levels and/or types of the user content 114 can be managed by scoping the access to different levels of the content hierarchy.

The content management service 108 further includes an authentication module 116, which is representative of functionality to perform various authentication-related tasks and procedures. The authentication module 116, for instance, enables authentication of the resource users 104 for access to the resource content 110. Further, the authentication module 116 enables access by the network resource 102 to the user content 114 to be managed in various ways.

In at least some embodiments, the authentication module 116 may provide authentication services for the network resource 102. Alternatively or additionally, the authentication module 116 may not perform actual authentication procedures itself, but may serve as an authentication broker that leverages one or more $3^{rd}$ party authentication services. According to one or more embodiments, authentication-related tasks may be distributed between the authentication module 116 and other authentication services.

According to one or more embodiments, the authentication module 116 may be hosted by a particular network resource, such as a social media platform, an online communication service (e.g., a voice communication service, a messaging service, and so forth), an email service, a website, and so forth.

Further to performing different authentication tasks, the authentication module 116 may employ one or more of a variety of different authentication protocols, such as OAuth, OpenID, Security Assertion Markup Language (SAML), and so forth.

Further to the environment 100, the network resource 102 includes a login module 118, which is representative of functionality to provide an authentication portal for the resource users 104 for access to the network resource 102. For instance, consider that a resource user 104 requests access to the network resource 102, e.g., by browsing to a website hosted by the network resource 102. In response to the request, the login module 118 presents a login experience to the resource user 104, such as by presenting a login window that enables the resource user 104 to provide authentication credentials. The login module 118 interacts with the authentication module 116 to authenticate the resource user 104, such as by providing authentication credentials to the authentication module 116. As further detailed below, the login module 118 and the authentication module 116 can interact in various ways to authenticate the network resource 102 and/or the resource users 104 for access to the user content 114.

Having described an example environment in which the techniques described herein may operate, consider now a discussion of some example implementation scenarios in accordance with one or more embodiments.

Example Implementation Scenarios

This section describes some example implementation scenarios for scoped access to user content. For purpose of example only, the scenarios are described using various entities introduced above with reference to environment 100.

Figure 2:
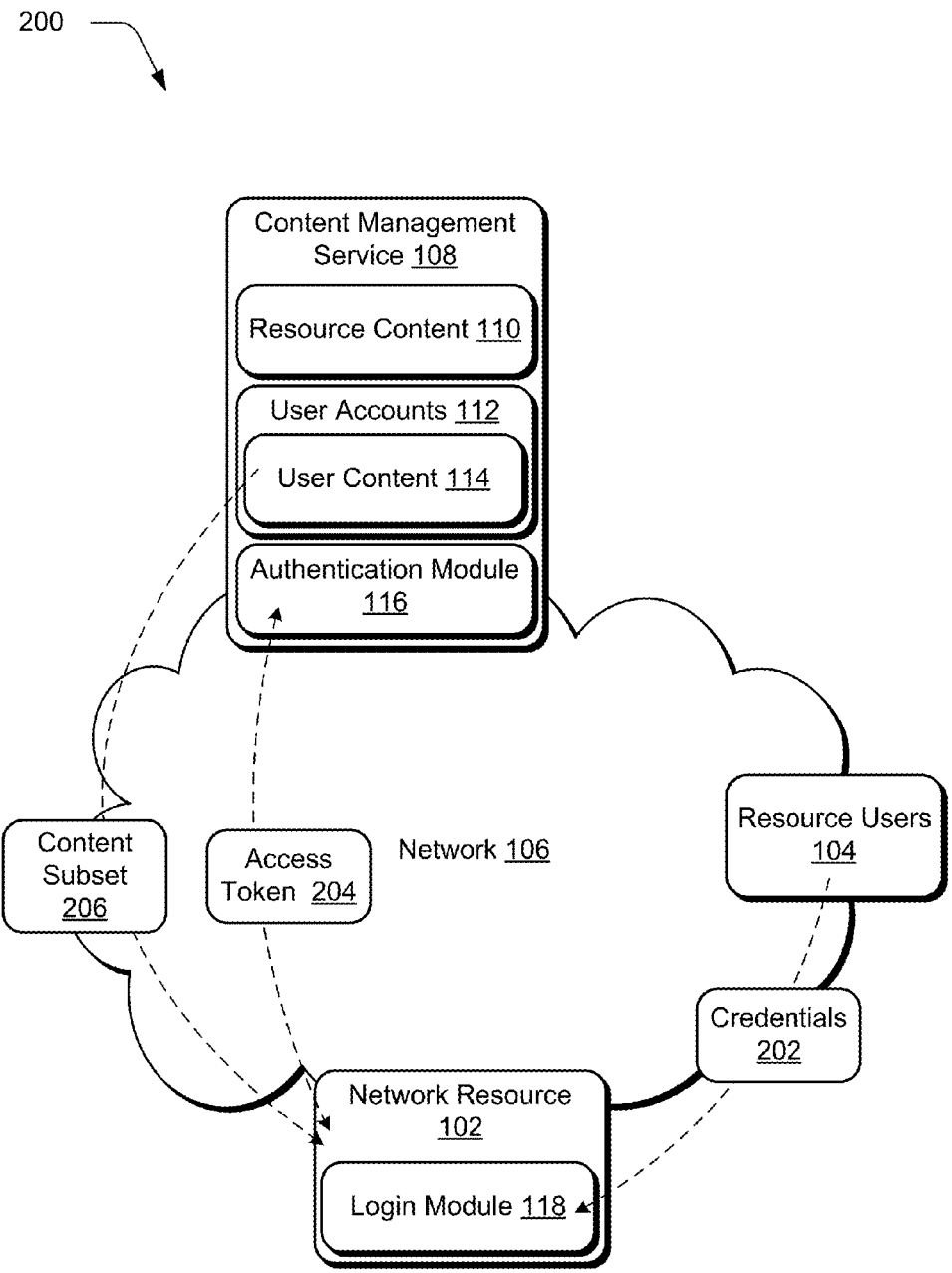
FIG. 2 illustrates an example implementation for authentication for access to user content in accordance with one or more embodiments.

FIG. 2 illustrates an example implementation scenario, generally at 200. The scenario 200 illustrates an example implementation for authentication for access to user content in accordance with one or more embodiments.

In the scenario 200, the resource user 104 navigates to and/or interacts with the network resource 102. For instance, consider that the network resource 102 is a travel website that enables the resource user 104 to arrange travel details. The resource user 104 navigates (e.g., browses) to the network resource 102, and is presented with a login experience by the login module 118. Further to the login experience, the resource user 104 provides credentials 202, such as a user identifier (user ID) and some form of authentication factor, such as a password. These examples of credentials are presented for purpose of illustration only, and a wide variety of other types and instances of authentication information may be employed.

In at least some embodiments, the login module 118 presents a graphical user interface (GUI) that enables the user to provide the credentials 202. Alternatively or additionally, the login module 118 can redirect the resource user 104 to the content management service 108, which implements its own particular authentication procedure via the authentication module 116.

Continuing with the scenario 200, the login module 118 interacts with the authentication module 116 to authenticate the resource user 104. For instance, the credentials 202 are provided to the authentication module 116, such as by the login module 118 and/or the resource user 104. The authentication module 116 matches the credentials 202 to one of the user accounts 112, or generates a new user account 112 for the resource user 104.

As part of the authentication procedure, the content management service 108 determines a scope of access that specifies which user content 114 for the particular resource user 104 the network resource 102 is permitted to access. The scope of access can be determined in various ways, such as by querying a user to specify which user content 114 the network resource 102 is allowed to access. Example ways for specifying scope of access to the user content 114 are discussed below.

Using information that describes the scope of permitted access, an access token 204 is generated (e.g., by the authentication module 116) that is used as an identifier for the network resource 102. The access token 204, for instance, is provided by the authentication module 116 to the network resource 102. The network resource 102 uses the access token 204 to request and obtain a content subset 206 of the user content 114 that is associated with the resource user 104.

As further detailed below, the content subset 206 that is accessible by the network resource 102 is determined based on the scope specified in the access token 204. For instance, the access token 204 may specify a certain type and/or level of the user content 114 that the network resource is allowed to access. The content subset 206 may be generated by retrieving content from the user content 114 that matches the scope specified in the access token 204.

According to one or more embodiments, the network resource 102 is denied access to user content 114 that is outside of the scope specified in the access token 204. For instance, the scope specified by the access token 204 may indicate that the network resource 102 is permitted to access profile information for the resource user 104. User content 114 outside of the profile information for the resource user 104 may be inaccessible using the access token 204. Example ways of generating and processing the access token 204 are detailed below.

In at least some embodiments, the access token 204 is temporary. For instance, the access token 204 may have a finite lifetime (e.g., 1 hour), after which the access token 204 will expire. Alternatively or additionally, the access token 204 may have a transaction threshold that specifies a maximum number of content requests that may be made utilizing the access token 204. If the number of content requests that utilize the access token 204 exceed the transaction threshold, the access token 204 may be revoked and/or expire. If the access token 204 expires and/or is revoked, the access token 204 may no longer be valid for retrieving user content 114, e.g., for enabling access to the content subset 206. Thus, according to one or more embodiments, the access token 204 may be leveraged as a temporary resource ID for the network resource 102 to request access to the content subset 206 for the particular resource user 104.

Figure 3:
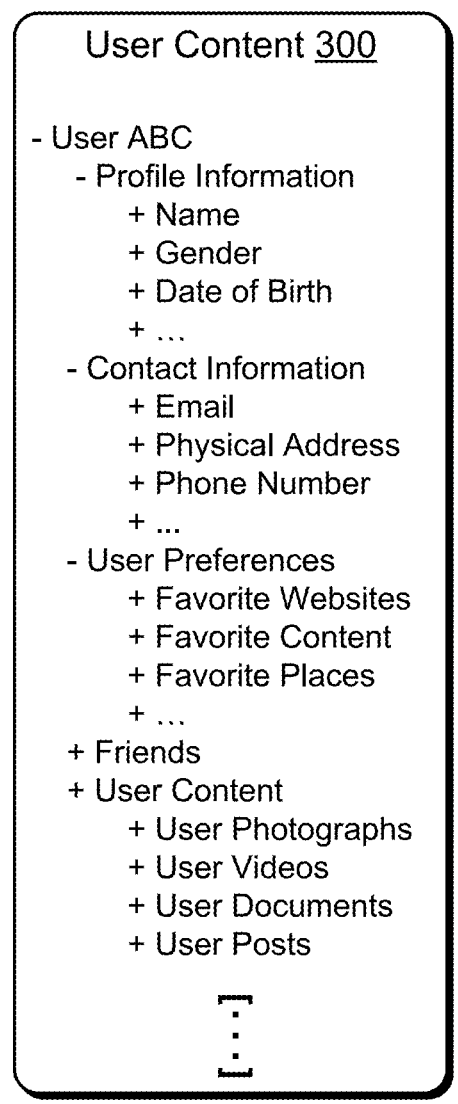
FIG. 3 illustrates an example of user content for a particular resource user in accordance with one or more embodiments.

FIG. 3 illustrates user content 300 for a particular resource user 104 in accordance with one or more embodiments. The user content 300, for example, represents an example implementation of the user content 114 introduced above. As illustrated, the user content 300 is arranged in a hierarchical manner such that various categories and sub-categories of user content are specified. Although not expressly illustrated here, the user content 300 further includes values and/or instances for user content for the different categories and sub-categories of the user content 300.

The user content 300 includes a user ID ("User ABC") that differentiates the particular user from others of the resource users 104. The user content 300 also includes general categories of user content, such as a profile information category, a contact information category, user preferences, friends, user content, and so forth. Included under at least some of the general categories are sub-categories of the user content 300, such as different types of profile information, different forms of contact information, and so on. Although not expressly illustrated here, the categories and sub-categories further include and/or point to instances of the user content 300. For example, instances of user content (e.g., photos, video, documents, and so forth) may be accessible via the user content category.

According to embodiments discussed herein, access to user content 300 may be controlled by specifying scope for the access. For instance, access may be granted that is scoped to "profile information" such that a requesting entity (e.g., the network resource 102) is permitted to access user content 300 specified under the profile information scope, e.g., name, gender, date of birth, and so forth. Access to other user content 300 that is outside of the profile information scope (e.g., contact information, user preferences, friends, user content, and so on) may not be permitted. Thus, in at least some embodiments, "scope" refers to using hierarchical levels of user content to specify levels and/or categories of content that may be accessed by different entities.

In at least some embodiments, scope can be specified using a Uniform Resource Identifier (URI) that indicates a particular scope for access to the user content 300. For instance, a URI that includes " . . . userABC/usercontent/profile" may grant access to profile information, but not other types of user content. In another example, a URI that includes " . . . userABC/usercontent/contactinformation/email" may grant access to the user's email address, but not other contact information or other user content.

According to one or more embodiments, a request for user content 300 that includes a URI (e.g., as part of an access token) can be mapped directly to the content specified by the scope. For example, a request for user content that includes a URI portion "userABC/usercontent/contactinformation/email" can be mapped directly to the email information for "userABC," without requiring intermediate mapping and/or translation of the request. Further details concerning scope are presented below.

Having described some example implementation scenarios in which techniques described herein may be employed, consider now a discussion of some example procedures in accordance with one or more embodiments.

Example Procedures

The following section describes some example procedures for scoped access to user content in accordance with one or more embodiments. The example procedures may be employed in the environment 100 of FIG. 1, the system 700 of FIG. 7, and/or any other suitable environment. In at least some embodiments, steps described for the various procedures are implemented automatically and independent of user interaction.

Figure 4:
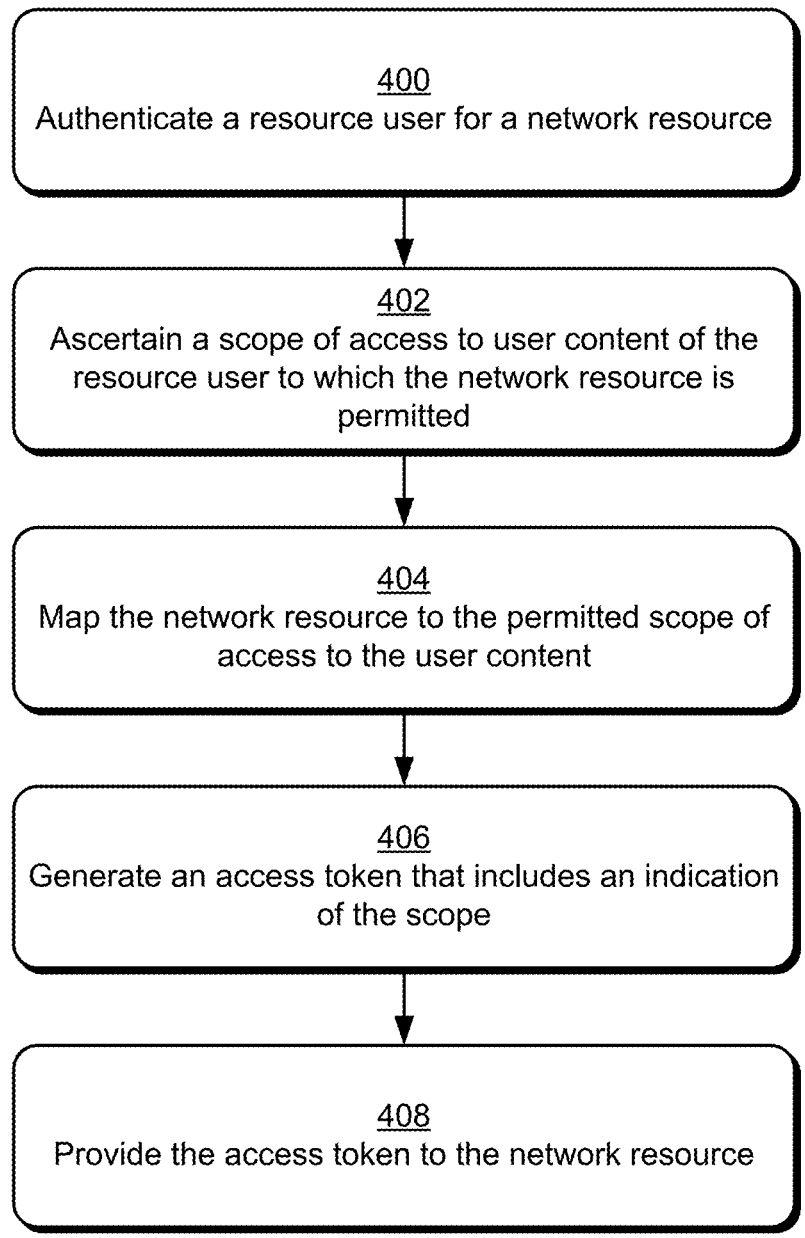
FIG. 4 is a flow diagram that describes steps in a method for generating an access token for access to user content in accordance with one or more embodiments.

FIG. 4 is a flow diagram that describes steps in a method in accordance with one or more embodiments. The method, for instance, describes an example way of generating an access token for access to user content.

Step 400 authenticates a resource user for a network resource. For instance, the authentication module 116 authenticates the resource user 104 for interaction with the network resource 102. In at least some embodiments, the authentication may include matching user credentials provided by the resource user 104 to an existing user account 112. Alternatively or additionally, the authentication can be performed further to generating a new user account 112 for the resource user 104.

Step 402 ascertains a scope of access to user content of the resource user to which the network resource is permitted. The scope can be determined in various ways. For instance, when the resource user 104 creates an account with the network resource 102, as part of the account creation process the resource user 104 can specify which type(s) of user content that the network resource is permitted to access and/or is not permitted to access.

Alternatively or additionally, the resource user 104 can be queried to specify whether the network resource 102 is permitted to access a particular scope of user content. For instance, when the resource user 104 logs into the network resource 102, the resource user 104 can be queried as to whether the network resource 102 is permitted to access a particular scope and/or scopes of user content.

As another example, when the network resource 102 requests a particular type of user content 114 from the content management service 108, the authentication module 116 can query the resource user 104 as to whether such access is permitted. The authentication module 116, for instance, can present a query interface (e.g., a popup window) that displays a prompt asking whether the user wants to allow the network resource 102 to access a particular category and/or instance of user content.

Step 404 maps the network resource to the permitted scope of access to the user content. The content management service 108, for instance, creates an access control entry that specifies that the network resource 102 is permitted access to the user content 114 for the particular resource user 104 according to the specified scope. In at least some embodiments, the content management service 108 maintains mappings for multiple different network resources that enable the different network resources to access the user content 114 according to different access scopes.

Step 406 generates an access token that includes an indication of the scope. The access token, for instance, can be used as a resource identifier for the network resource 104 to enable access to user content 114 according to the specified scope. In at least some embodiments, the scope may be specified via a URI, examples of which are presented above. As referenced above, the access token may be temporary such that the access token expires after a certain period of time and/or can be revoked. In at least some embodiments, the access token includes an identifier for the network resource that can be used to map the network resource to a permitted access scope, such as via the mapping referenced above. An example way of generating an access token is detailed below.

Step 408 provides the access token to the network resource. The content management service 108, for instance, transmits and/or communicates the access token to the network resource 102. The network resource 102 may utilize the access token to request user content 114 according to the scope specified in the access token.

While certain operations are discussed above as being performed at the content management service 108, it is to be appreciated that one or more operations may occur elsewhere. For instance, when a resource user is authenticated (e.g., via the content management service 108), operations related to generating an access token may occur at the network resource 102 and/or other entity.

Figure 5:
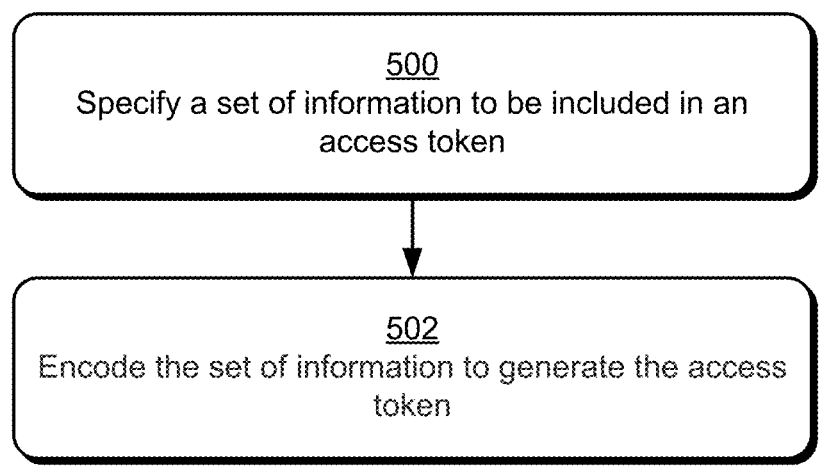
FIG. 5 is a flow diagram that describes steps in a detailed method for generating an access token for access to user content in accordance with one or more embodiments.

FIG. 5 is a flow diagram that describes steps in a method in accordance with one or more embodiments. The method, for instance, describes a detailed example way of generating an access token for access to user content.

Step 500 specifies a set of information to be included in an access token. In an example implementation, for instance, the access token is generated by populating a token (e.g., a JavaScript Object Notation (JSON) web token (JWT)) with various types of information, including information identifying the permitted scope of access.

For example, certain information can be concatenated to form a claims set of the token that can be processed in various ways. Consider, for instance, the following set of information:

{iss:ContentManagementService, sub:UserABC, exp: 1393956478, iat:1393952878, scope:/profile}

In this claims set, the "iss" claim identifies an entity that issued the access token, such as the content management service 108 and/or the authentication module 116.

The "sub" claim identifies the subject of the access token, e.g., the resource user 104 for which the access token is generated. The subject, for instance, can be used to match an access token to a user account 112 for purpose of identifying user content 114 associated with a particular user, The "exp" claim specifies an expiration time for the access token and the "iat" specifies a time at which the access token was generated. As referenced above, an access token may be invalid after a certain period of time after the token was generated, and/or after an expiration time elapses.

The "scope" claim identifies an access scope that is permitted via the access token. As discussed herein, the scope can be based on hierarchical levels of user content, and can be scoped broadly (e.g., to general categories of user content), intermediate (e.g., to sub-categories of content), and/or narrowly, e.g., to particular instances of user content. To enable streamlined access to user content, access scope can be specified via, a URI that identities various attributes of the scope. Examples of such URIs are presented above.

In at least some embodiments, scope can be qualified with a particular type of access permission. For instance, a scope of "/R-/profile" provides read-only permissions for access to user profile information, such as via an HTTP GET request. As another example, a scope of "/RW-/userpreferences" may allow read and write access to user preference information, such as via GET and/or POST requests. Thus, a permitted scope of access may include further detail as the type and/or extent of the permitted access. The type of access to user content may be configured in various ways, such as via user input specifying the type of access and/or interaction allowed.

The example token information and/or claims discussed above are presented for purpose of illustration only, and it is to be appreciated that a. variety of other types and instances of information can be included in an access token in accordance with various embodiments, Step 502 encodes the set of information to generate the access token. The set of information can be encoded in various ways, such as by using an algorithm for encoding, encryption, and so forth. In at least some embodiments, the set of information is encoded via a Base64 encoding scheme. The encoded access token can then be transmitted and/or transported in various ways to enable scoped access to user content.

Having discussed example methods for generating an access token, consider now an example method for utilizing an access token to enable scoped access to user content.

Figure 6:
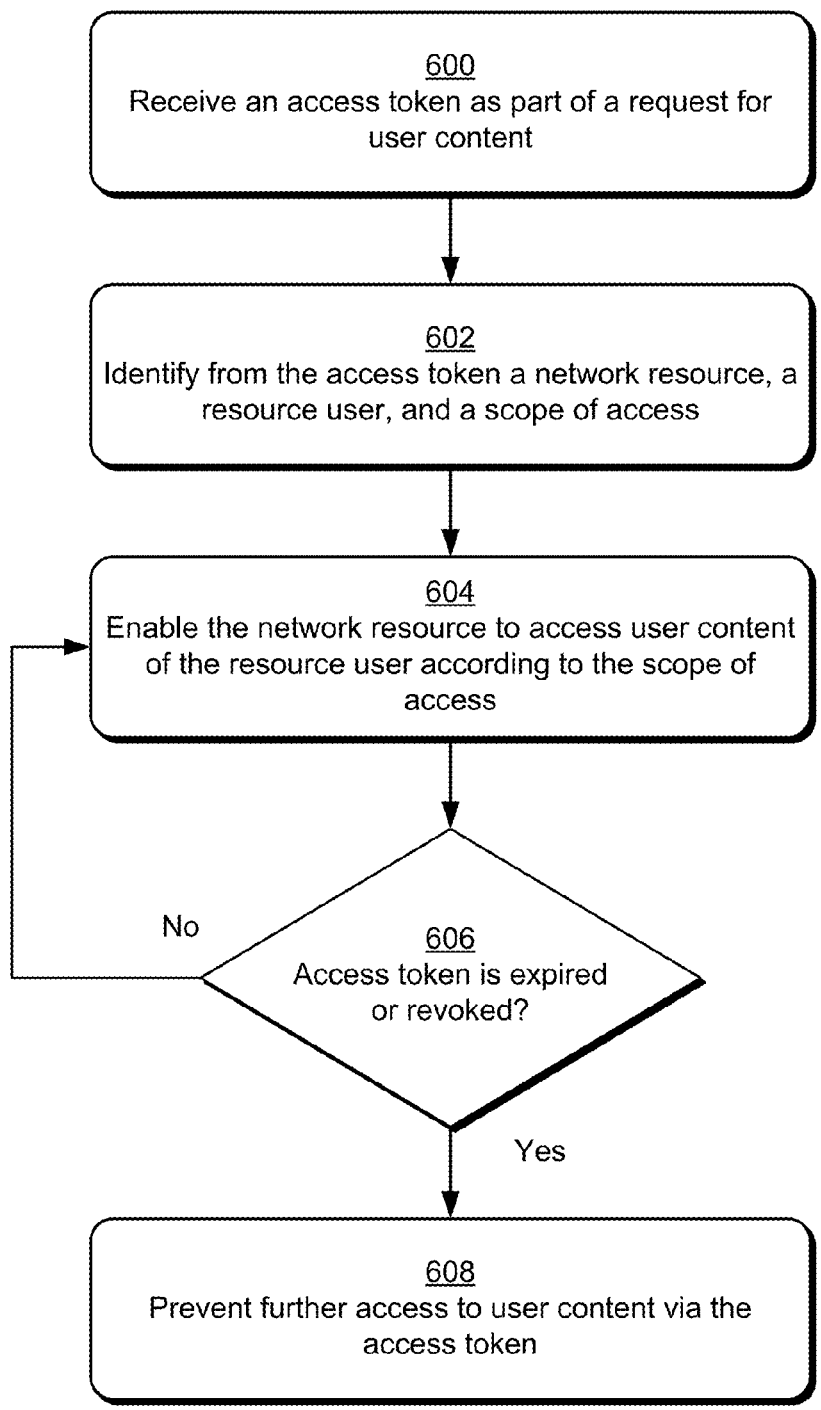
FIG. 6 is a flow diagram that describes steps in a method for enabling access to user content via an access token in accordance with one or more embodiments.

FIG. 6 is a flow diagram that describes steps in a method in accordance with one or more embodiments. The method, for instance, describes a detailed example way of enabling access to user content via an access token.

Step 600 receives an access token as part of a request for user content. The content management service 108, for instance, receives a request from the network resource 102 for access to the user content 114, e.g., a subset of the user content 300. The request includes an access token.

Step 602 identifies from the access token a network resource, a resource user, and a scope of access. For example, the authentication module 116 decodes the access token and identifies various information included in the token, examples of which are discussed above. The access token may be decoded using a particular scheme and/or algorithm that was used to encode the access token, such as a decryption algorithm, a Base64 scheme, and so forth.

Among the information included in the token are an identifier for a network resource (e.g., the network resource 102), an identifier for a resource user (e.g., the resource user 104), and a scope of access permitted to the network resource for access to user content for the resource user. In at least some embodiments, the access token may specify a type of access along with the scope, such as read-only access, read-write access, and so forth.

Step 604 enables the network resource to access user content of the resource user according to the scope of access. The content management service 108, for instance, enables the network resource 102 to access a subset of the user content 114 for the resource user 104 according to the scope specified in the access token. User content that corresponds to the scope may be retrieved (e.g., pulled) by the network resource, and/or pushed to the network resource.

As referenced above, scope can be specified via a URI that identifies the particular scope of access. Thus, when enabling access to user content, the URI can be mapped directly to a portion of a content storage structure and/or content hierarchy specified by the URI. In at least some embodiments, a URI included in an access token can be mapped directly to user information that corresponds to a scope specified in the URI without requiring intermediate mapping or translation of scope information. Further, content outside of the scope specified in the URI is not accessible via the URI.

Step 606 ascertains whether the access token is expired or revoked. As referenced above, an access token may have an expiration time period and/or date, after which the token is no longer valid for accessing user content. Alternatively or additionally, the access token may be revoked (e.g., prior to expiration), such as in response to an indication that the access token was fraudulently generated and/or obtained.

If the access token is not expired or revoked ("No"), the method returns to step 604. If the access token is expired or revoked ("Yes"), step 608 prevents further access to user content via the access token. For instance, if the content management service 108 receives the access token as part of a request for user content after the token is revoked and/or expired, the content management service 108 will deny the request. In at least some embodiments, if the access token is expired and/or revoked, an access control entry that includes the token is deleted.

Having discussed some example procedures for scoped access to user content, consider now a discussion of an example system and device in accordance with one or more embodiments.

Example System and Device

Figure 7:
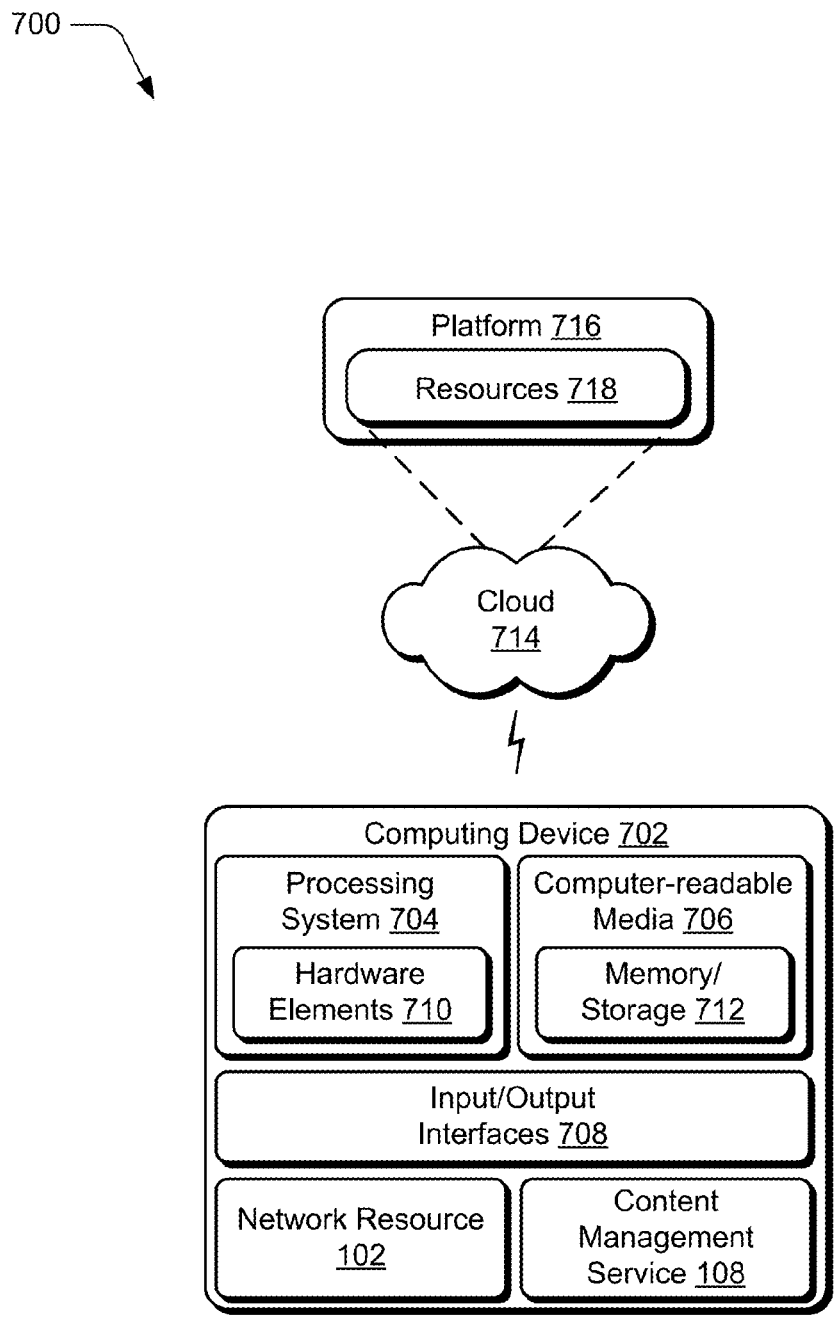
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement the various techniques described herein. This is illustrated through inclusion of the network resource 102 and the content management service 108, which may be employed to implement techniques for scoped access to user content discussed herein. The computing device 702 may be, for example, a server of a service provider, an on-chip system, and/or any other suitable computing device or computing system.

The computing device 702 as illustrated includes a processing system 704, one or more computer-readable media 706, and one or more I/O interfaces 708 that are communicatively coupled and/or connected, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 are illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Discussed herein are a number of methods that may be implemented to perform techniques discussed herein. Aspects of the methods may be implemented in hardware, firmware, or software, or a combination thereof. The methods are shown as a set of blocks (e.g., steps) that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100, the system 700, and so on.

CONCLUSION

Techniques for scoped access to user content are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   one or more processors; and
   one or more computer-readable storage media storing computer-executable instructions that, responsive to execution by the one or more processors, cause the system to perform operations including:
      authenticating a resource user for a network resource;
      ascertaining a scope of access to user content of the resource user to which the network resource is permitted, the user content being arranged in a content hierarchy and the scope including a reference to a level of the hierarchy that corresponds to a subset of the user content;
      generating an access token, said generating including:
         generating a URI that includes an identifier for the network resource, an identifier for the resource user, an indication of the scope, and a type of access permitted to the network resource, the indication of the scope being directly mappable to the subset of the user content;
         encoding the URI to generate the access token; and
      providing the access token to the network resource to enable the network resource to use the access token to access the subset of the user content.

2. A system as described in claim 1, wherein the network resource comprises a website, and wherein said ascertaining comprises receiving an indication from the resource user of the scope of access to the user content permitted to the website.

3. A system as described in claim 1, wherein the type of access indicates at least one of read access or write access to the subset of the user content.

4. A system as described in claim 1, wherein the type of access includes one of read-only access or read and write access to the subset of the user content.

5. A system as described in claim 1, wherein said generating comprises including, in the access token, at least one of an expiration time or an expiration date for the access token.

6. A system as described in claim 1, wherein the operations further comprise utilizing the access token as a temporary identifier for the network resource.

7. A computer-implemented method, comprising:
   ascertaining a scope of access to user content of a resource user to which a network resource is permitted, the user content being arranged in a content hierarchy and the scope including a reference to a level of the hierarchy that corresponds to a subset of the user content;
   generating an access token by:
      generating a uniform resource identifier (URI) that includes an identifier for the network resource, an identifier for the resource user, an indication of the scope, and a type of access permitted to the network resource, the URI being directly mappable to the subset of the user content;
      encoding the URI to generate the access token; and
   providing the access token to the network resource to enable the network resource to request access to the subset of the user content.

8. A computer-implemented method as recited in claim 7, wherein said ascertaining comprises:
   querying the resource user for the scope of access; and
   receiving, in response to the query, input from the resource user specifying the scope of access.

9. A computer-implemented method as recited in claim 7, wherein said generating further includes generating the token to include at least one of an expiration time or an expiration date for the access token.

10. A computer-implemented method as recited in claim 7, wherein said generating further comprises generating the URI to include a type of access permitted for the resource user to the subset of the user content, the type including one of read-only access or read and write access.

11. A system as described in claim 1, wherein said ascertaining comprises:
   querying the resource user for the scope of access; and
   receiving, in response to the query, input from the resource user specifying the scope of access.

12. A system as described in claim 1, wherein the operations further include creating an access control entry for the user content which includes the indication of the scope and the type of access permitted to the network resource.

13. A computer-implemented method as recited in claim 7, further comprising creating an access control entry for the user content which includes the indication of the scope and the type of access permitted to the network resource.

14. A computer-implemented method as recited in claim 7, further comprising utilizing the access token as a temporary identifier for the network resource.

15. A computer-implemented method as recited in claim 7, further comprising
   ascertaining that the access token is at least one of expired or revoked; and
   in response to said ascertaining, preventing further access the subset of user content via the access token.

16. One or more computer-readable storage media having instructions stored thereon that, responsive to execution by one or more processors, cause the one or more processors to perform operations comprising:

ascertaining a scope of access to user content of a resource user to which a network resource is permitted, the user content being arranged in a content hierarchy and the scope including a reference to a level of the hierarchy that corresponds to a subset of the user content;

generating an access token by:
  generating a uniform resource identifier (URI) that includes an identifier for the network resource, an identifier for the resource user, an indication of the scope, and a type of access permitted to the network resource, the URI being directly mappable to the subset of the user content;
  encoding the URI to generate the access token; and
  providing the access token to the network resource to enable the network resource to request access to the subset of the user content.

17. One or more computer-readable storage media as recited in claim 16, wherein said ascertaining comprises:
  querying the resource user for the scope of access; and
  receiving, in response to the query, input from the resource user specifying the scope of access.

18. One or more computer-readable storage media as recited in claim 16, wherein said generating further includes generating the token to include at least one of an expiration time or an expiration date for the access token.

19. One or more computer-readable storage media as recited in claim 16, wherein said generating further comprises generating the URI to include a type of access permitted for the resource user to the subset of the user content, the type including one of read-only access or read and write access.

20. One or more computer-readable storage media as recited in claim 16, wherein the network resource comprises a website, and wherein said ascertaining comprises receiving an indication from the resource user of the scope of access to the user content permitted to the website.

* * * * *